United States Patent
Lafuma et al.

(10) Patent No.: US 6,382,557 B1
(45) Date of Patent: May 7, 2002

(54) PERMANENTLY ROTATING FREE AEROSTAT MOBILE IN RADIAL TRANSLATION RELATIVE TO AMBIENT AIR

(75) Inventors: Pierre Lafuma; Andre Vargas, both of Toulouse; Jean François Joseph Evrard, Ramonville; Flavien Michel François Mercier, Auzeville, all of (FR)

(73) Assignee: Centre National d'Etudes Spatiales (C.N.E.S.), Paris Cedex (FR)

( * ) Notice: Subject to any disclaimer, the term of this patent is extended or adjusted under 35 U.S.C. 154(b) by 0 days.

(21) Appl. No.: 09/623,904

(22) PCT Filed: Mar. 10, 1999

(86) PCT No.: PCT/FR99/00533

§ 371 Date: Sep. 11, 2000

§ 102(e) Date: Sep. 11, 2000

(87) PCT Pub. No.: WO99/46165

PCT Pub. Date: Sep. 16, 1999

(30) Foreign Application Priority Data

Mar. 11, 1998 (FR) .............................. 98 02959

(51) Int. Cl.⁷ ................................................ B64B 1/02
(52) U.S. Cl. .......................... 244/12.2; 244/30; 244/39; 244/52
(58) Field of Search ............................... 246/12.2, 12.3, 246/234, 30, 39, 26, 29

(56) References Cited

U.S. PATENT DOCUMENTS 2,432,775 A * 12/1947 Lennon ........................ 244/39
3,503,573 A * 3/1970 Modesti ..................... 244/12.2
3,794,273 A * 2/1974 Girard ........................... 244/39
4,433,819 A * 2/1984 Carrington ................. 244/12.2
4,807,830 A    2/1989 Horton
5,348,254 A * 9/1994 Nakada ........................ 244/30
5,351,911 A   10/1994 Neumayr
5,678,783 A   10/1997 Wong
6,016,991 A * 1/2000 Lowe, Jr. ................... 244/12.2

FOREIGN PATENT DOCUMENTS

| FR | 1107257 | 12/1955 | |
| FR | 2366989 | 5/1978 | |
| GB | 2 082 995 | 3/1982 | |
| IT | 547021 | * 8/1956 | ................ 244/12.2 |
| WO | WO 97/33790 | 9/1997 | |

OTHER PUBLICATIONS by F. Buisson et al., "The Pronaos Project: Design, Development and In–Flight Results", *International Astronautical Federation*, Jun. 1997, pp. 1–15.

* cited by examiner

Primary Examiner—Galen L. Barefoot
(74) Attorney, Agent, or Firm—Young & Thompson

(57) ABSTRACT

The invention concerns a free lighter-than-air aerostat comprising a structure (1, 3, 4, 5) symmetrical relative to a main axis (2), at least one main sealed pressurized chamber (16), one or several particle emitting thrusters (8), adapted to drive the aerostat in rotation in one direction about the main axis (2), one or several moving flaps (9) adapted to be set either in an active state wherein they brake the aerostat rotation, or in an inoperative state wherein they offer no substantial resistance to the aerostat rotation, and on-board control means (19) adapted to control the thrusters (8) and the flaps (9) to drive the aerostat in permanent rotation about the main axis (2), and in translation perpendicular to the main axis (2).

21 Claims, 5 Drawing Sheets

PERMANENTLY ROTATING FREE AEROSTAT MOBILE IN RADIAL TRANSLATION RELATIVE TO AMBIENT AIR

The invention relates to a lighter-than-air aerostat, of the type comprising at least one main chamber closed in a sealed manner, with a constant volume, which is pressurised by a gas lighter than air, such as to permit rising and flight of the aerostat. Throughout the present application, "aerostat" means any vehicle lighter than air, and "geostationary" means the fact that an aerostat remains at least substantially vertical relative to a point which is fixed in relation to the ground.

So-called free aerostats are those which are not connected mechanically to the ground, unlike captive aerostats. Conventional free balloons have the disadvantage that they drift, in particular horizontally, in relation to the ground, according to the winds, without any possibility of controlling their position or their path. Captive balloons do not have this disadvantage, and are at least substantially geostationary. However, they require at least one cable for connection to the ground, which is heavy and triangulated, is a source of danger for air traffic, and in practice prevents selection of this technology for aerostats which are designed to fly at a high altitude, and in particular for stratospheric aerostats.

If it is required to be able to pilot the horizontal position (i.e. the position relative to the ground) and/or the horizontal path of a free aerostat for a long period of time (ranging from a few months to several years), it is out of the question to have on board consumable energy. With solar energy, the problem must be faced of the weight of the collector devices and of the means of storage, taking into account firstly the fact that the efficiency of the electric motors (in particular the ratio of the thrust to the power consumed) is too low, and secondly the night flight which must be assured.

In addition, since free aerostats are extremely sensitive to meterological conditions and horizontal winds, a very large inflated volume must be provided, in order to be able to carry on-board position-correction motors, the power of which makes it possible to compensate for the horizontal aerodynamic drag.

In particular, it is known that a stratospheric geostationary balloon would require a minimum volume of approximately 350,000 $m^3$, and a minimum weight of approximately 10 tonnes, in order to be able to carry motors making it possible to control its horizontal position and/or its horizontal path at a stratospheric altitude, as well as a useful load such as a telecommunications system. Dimensions of this type represent a substantial volume, and a significant risk for air traffic, and for the populations, if the balloon falls or is destroyed. In addition, these dimensions cause problems of practical production and launching. In addition, the assembly would have a high cost, for relatively low reliability.

However, long-lasting stratospheric missions would permit scientific study of the upper atmosphere, observation of the earth, improvement of telecommunications, etc. In particular, it is desirable to be able to have at a stratospheric altitude numerous devices which can act as active or passive relays for hertzian connections, for example for telecommunications satellites (mobile telephony, radio, television, data networks, etc) or localisation satellites (GPS, Argos systems, etc).

Therefore, there is a need to be able to place vehicles at a high atmospheric altitude, and in particular at a stratospheric altitude, the position or displacements of which relative to the ground, in particular horizontally, can be controlled automatically or from the ground, without a human pilot on board, for a duration which can be between a few days and several years.

The object of the invention is thus to eliminate these disadvantages, by providing a free vehicle which is designed for a high atmospheric altitude, and in particular a stratospheric altitude, and of which the horizontal position (in longitude and latitude) and/or the horizontal displacements relative to the ground can be controlled automatically, autonomously or from the ground, for a substantial period of time.

In particular, the object of the invention is to solve the problem posed by the energy necessary for motorisation, which makes it possible to maintain the horizontal position and/or to follow a horizontal path.

More particularly, the object of the invention is to provide a vehicle of this type, formed from an aerostat which is designed for a high atmospheric altitude, and in particular a stratospheric altitude, the volume of which is limited, and in particular is between 10 $m^3$ and 10,000 $m^3$, for example approximately 2,000 $m^3$, for a weight of between 10 kg and 500 kg, and in particular between approximately 50 kg and 200 kg.

In addition, the object of the invention is to provide an aerostat which is particularly suitable for acting as an active and/or passive relay for transmission of data by hertzian means, in particular in the field of hyperfrequencies.

For this purpose, the invention relates to a lighter-than-air aerostat, comprising:

- a strengthening structure, which defines a shape which is symmetrical relative to a main axis;
- at least one main chamber closed in a sealed manner, which is integral with the said structure, and is pressurised by a gas which is lighter than air, such as to permit flight of the aerostat;
- means for driving the aerostat comprising:
- one or a plurality of particle-emission propulsion units supported by the said structure, which are regularly distributed around the main axis, and are designed to be able to drive the aerostat in rotation in one direction around the main axis, and to be able to be controlled from an active state to an inactive state and vice-versa, at least once for each rotation of the aerostat around the main axis;
- one or a plurality of mobile flaps, which are supported by the said structure outside the main chamber, are distributed regularly around the main axis, and are designed to be able to be controlled at least once for each rotation of the aerostat around the main axis, from an active state, in which they brake the rotation of the aerostat, whilst exerting aerodynamic thrust which tends to displace the aerostat in translation perpendicularly relative to the main axis, to an inactive state, in which they do not offer any substantial resistance to the rotation of the aerostat, and vice versa; and
- on-board control means, which are designed to control the propulsion units and the flaps in order to
- drive the aerostat in continuous rotation around the main axis; and
- drive the aerostat in translation, with at least one component which is perpendicular to the main axis, relative to the volume of air in which it moves.

"Translation with at least one component perpendicular to the main axis" means movement of translation in a direction of translation which has a component which is non-zero, according to the direction which is radial relative to the main axis, i.e. which is not parallel to the main axis. Preferably, advantageously and according to the invention, the means for driving the aerostat are designed to drive the aerostat in translation in a direction of translation which is at least substantially radial relative to the main axis, i.e. which is perpendicular to the main axis.

Advantageously, an aerostat according to the invention has an overall axial dimension parallel to the main axis which is smaller than that of its overall radial dimension perpendicular to the main axis. Preferably, and according to the invention, it has a general outer shape which is globally symmetrical in revolution around the main axis, and in particular is globally lenticular.

In one embodiment, and according to the invention, the aerostat has an overall radius of between 5 m and 50 m, and in particular approximately 15 m, and an overall axial height of between 1 m and 20 m, and in particular approximately 10 m.

Advantageously and according to the invention, the aerostat comprises at least one ionic actuator and/or at least one air pulsation unit, as a particle-emission propulsion unit, these particles then being respectively ions and/or gas molecules.

Advantageously and according to the invention, each of the propulsion units is associated with a peripheral portion of the said strengthening structure which is furthest away from the main axis, and is disposed such as to exert a drive force which is at least substantially tangential. Similarly, advantageously and according to the invention, each of the flaps is associated with a peripheral portion of the said structure which is furthest away from the main axis, and is disposed such as to exert a force which is at least substantially tangential.

Advantageously and according to the invention, each mobile flap extends at least substantially radially, and is mobile parallel to the main axis, between a position retracted in a flap compartment, in which it does not interfere with the relative current of air obtained from the displacements of the aerostat relative to the volume of air in which the aerostat is placed, and an extended position, in which it interferes with the current of air, and tends to brake the rotation of the aerostat around the main axis, whilst exerting reactive aerodynamic thrust, which drives the aerostat in translation.

In addition, advantageously and according to the invention, the on-board control means are designed such that, in a first angular sector, which extends from one side in a radial direction which is perpendicular to the main axis, and fixed in relation to the corresponding wind (independently of the rotation of the aerostat around the main axis), each propulsion unit is in the active state, and each flap is in the inactive state, whereas in a second angular sector, which extends to the other side of this radial direction, each propulsion unit is in the inactive state, and each flap is in the active state, such that the aerostat is driven in translation relative to the corresponding wind, at least substantially according to this radial direction. Preferably and according to the invention, the drive means are designed to be able to drive the aerostat in rotation around the main axis at a speed $\omega$ which is at least substantially constant, of between 1 rd/s and 100 rd/s, and in particular approximately $2\pi$ rd/s. In addition, advantageously according to the invention, each propulsion unit and each flap is designed to be able to be controlled from the inactive state to the active state, and from the active state to the inactive state, in a period of less than $2\pi/4\omega$, $\omega$ being the speed of rotation of the aerostat expressed in radians per second.

Advantageously, an aerostat according to the invention additionally comprises means for location of the position of the main axis relative to a reference point which is fixed in relation to the ground, and means for location relative to this same fixed reference point for the angular position (in rotation) of the structure relative to the main axis, and the said control means comprise calculation means which are designed to determine the control signals to be applied to each propulsion unit and to each flap, according to signals emitted by these location means, and in accordance with a predetermined instruction signal for the horizontal position and/or the horizontal path of the main axis, relative to the fixed reference point.

Advantageously, the aerostat according to the invention is characterised in that it comprises at least one flexible outer envelope, which delimits at least one main chamber which is sealed against gases, and is pressurised by a gas lighter than air, and in that each of the mobile flaps is disposed outside this outer envelope. Similarly, each propulsion unit is secured to the structure inside the envelope, and has a particle-ejection nozzle, which passes through the envelope in a sealed manner, in order to emit the particles outside the envelope.

Advantageously and according to the invention, the gas consists of helium, and the volume of the main chamber is designed to permit stratospheric flight of the aerostat.

Advantageously and according to the invention, the aerostat is additionally characterised in that the structure comprises a peripheral toric balloon, which is sealed against gases, and is over-pressured by a gas lighter than air, to a pressure greater than that of the main chamber, in that it comprises the same number of propulsion units as flaps, and in that it comprises support parts which are secured to this balloon, and are regularly distributed around the main axis, each support part supporting at least one propulsion unit and/or at least one mobile flap.

In one embodiment, and according to the invention, the structure comprises:

a rigid, globally cylindrical hollow/central core, which can enclose the electronic and/or computer and/or telecommunications and/or energy storage equipment, and/or equipment of an on-board mission;

an over-pressurised peripheral toric balloon;

support parts which are secured to the peripheral toric balloon, and support the propulsion unit(s) and the mobile flap(s);

connection means, which connect the central core and the support parts; and an outer envelope, which surrounds and/or completes the volume delimited by the peripheral toric balloon and the central core, in order to circumscribe at least one pressurised, sealed main chamber.

In addition, an aerostat according to the invention comprises an on-board energy source, which is designed to assure the energy supply at least of each propulsion unit. Preferably and according to the invention, this energy source is also designed to assure the energy supply of drive units for manoeuvring the flaps, as well as the energy supply of the control means, the location means, and the on-board mission, i.e. of the aerostat as a whole, which is then totally autonomous from the point of view of its energy supply.

Advantageously and according to the invention, the energy source comprises:

photovoltaic solar cells which are disposed on at least one upper surface portion of the aerostat; and means for storage of electrical energy.

The electrical energy storage means can consist of rechargeable accumulators and/or a fuel cell/fuel cells. Their capacity is determined such as to permit night flight.

The invention thus makes it possible to obtain a free aerostat which can be launched to a high altitude, and in particular to a stratospheric altitude, and of which the horizontal position and/or the horizontal path can be controlled automatically for a long period of time. In particular, it should be noted that the drive means for the aerostat make it possible to use for displacement in horizontal translation of the aerostat, most of the kinetic energy of the particles emitted by the propulsion units, which are themselves displaced relative to the volume of air (by the rotation of the aerostat) at a speed which is very much higher than the speed of horizontal translation of the aerostat. The propulsion power created by each propulsion unit is greatly increased compared with the case of an aerostat which is not driven in continuous rotation. For the same resulting force of propulsion in horizontal translation, the invention makes it possible to reduce considerably the energy consumption, and thus the weight of the energy source (solar cells, storage cells, etc), which is a determining factor within the context of production of a long-lasting free aerostat, which is geostationary, or mobile according to a predetermined path.

The invention also relates to an aerostat which is characterised in association by some or all of the characteristics described previously or hereinafter.

Other characteristics, objectives and advantages of the invention will become apparent from reading the following description, provided with reference to the attached drawings, in which.

Figure 1:
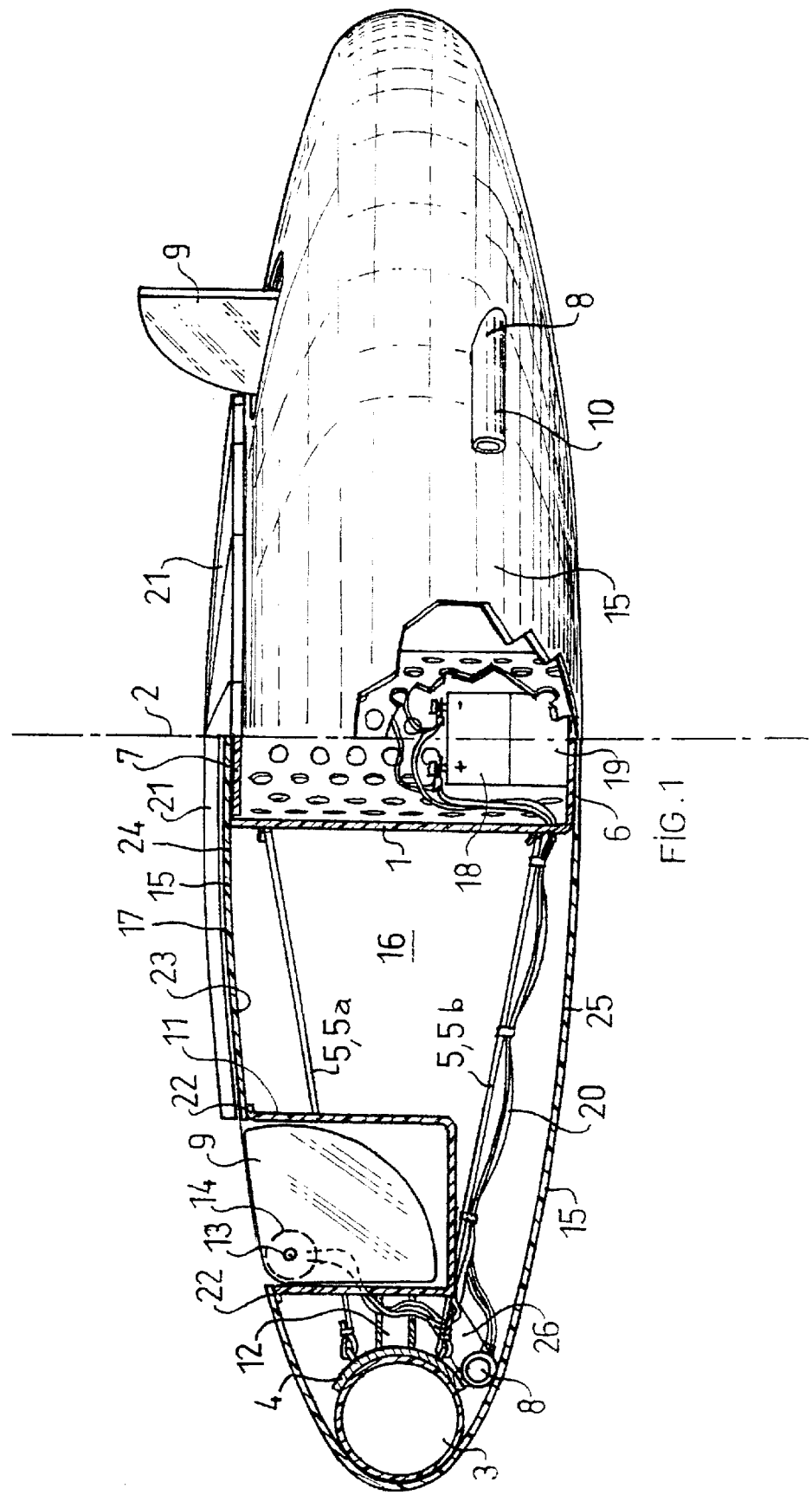
FIG. 1 is a view in axial cross-section (left-hand part) and in elevation (right-hand part) of an aerostat according to an embodiment of the invention.
Figure 2:
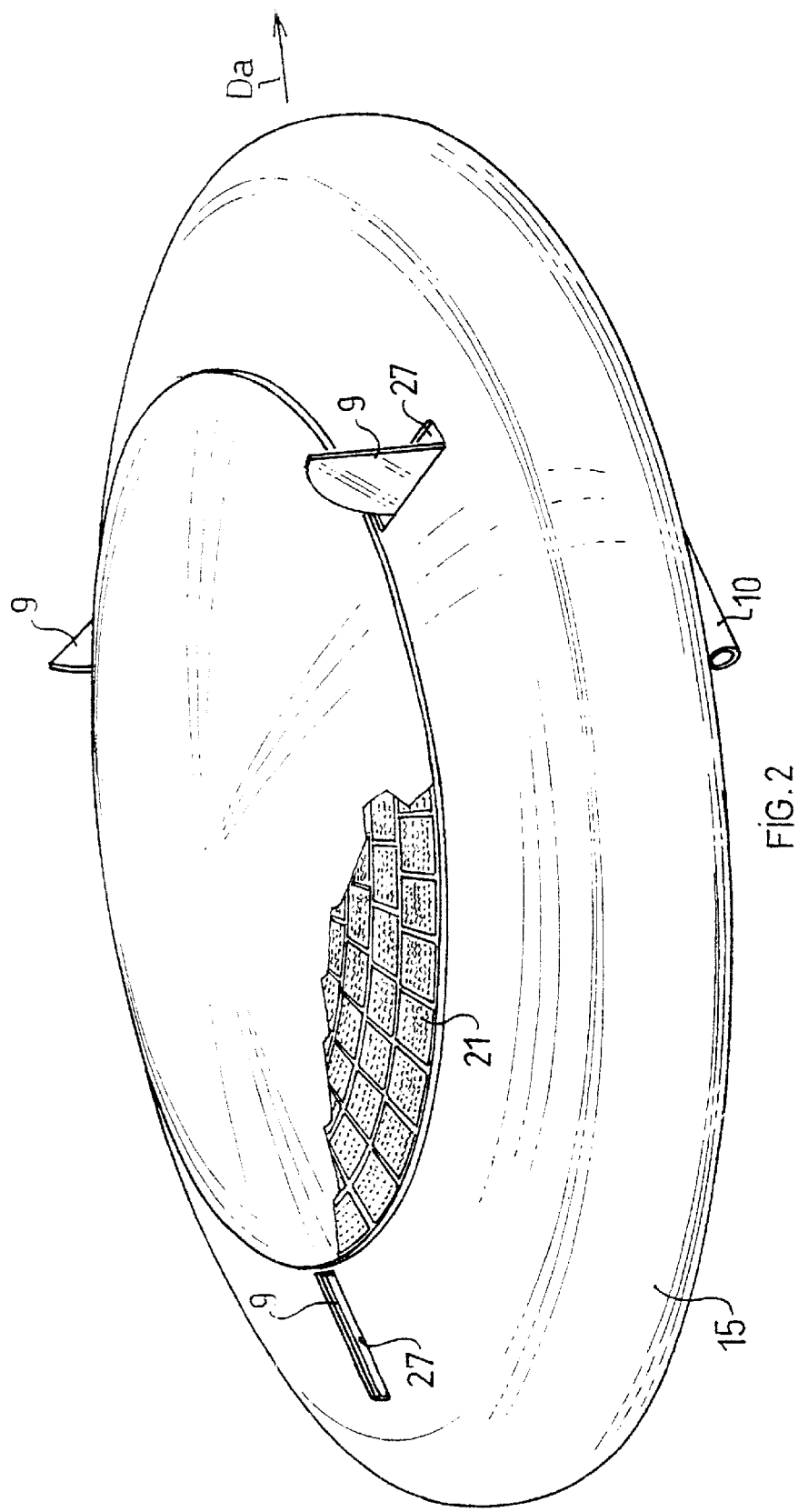
FIG. 2 is a perspective view of the aerostat in FIG. 1.
Figure 3:
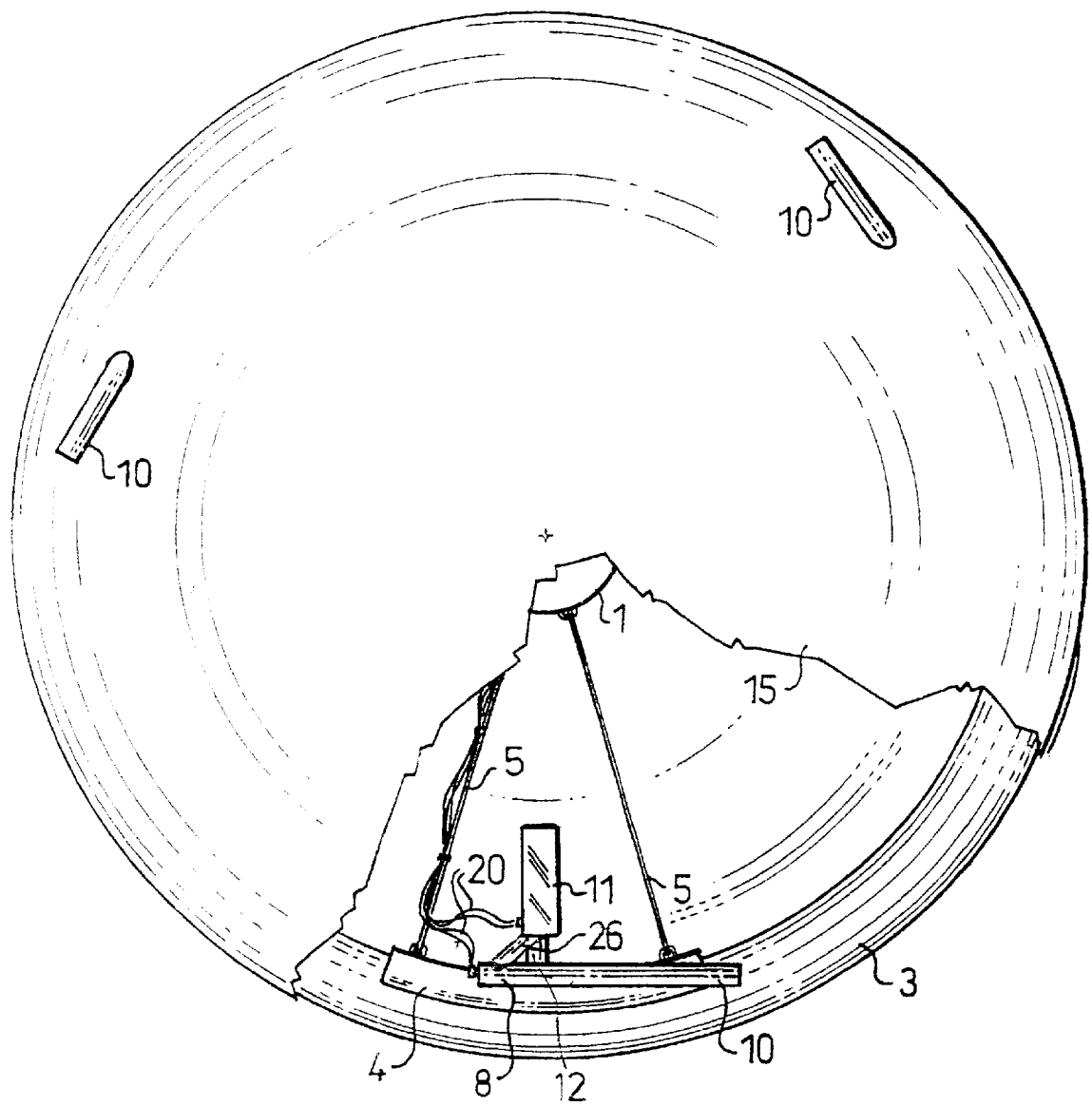
FIG. 3 is a partially cut-out plan view from below of the aerostat in FIG. 1.

The aerostat shown in the Figures comprises a strengthening structure 1, 3, 4, 5, consisting of a central core 1, which is globally cylindrical in revolution around a main axis 2; an over-pressurised peripheral toric balloon 3, which is symmetrical in revolution around the main axis 2; support parts 4 which are secured to the peripheral toric balloon 3; and connection units 5, which connect the central core 1 and the support parts 4, preferably in the form of flexible cables. These connection units 5 are designed such that in the flight position, the peripheral toric balloon 3 is centred on the main axis 2. In fact, since the aerostat is driven in continuous rotation, if these connections 5 consist of cables, the latter are stretched tight by centripetal force.

This strengthening structure is balanced in relation to the main axis 2. The same applies to the aerostat as a whole. This balancing is obtained by regular distribution of the weights around the axis 2, and, if necessary, by additional balancing weights positioned after completion of assembly of the aerostat. The strengthening structure and the aerostat as a whole (with the exception of the units which are incorporated inside the central core 1) have angular symmetry around the main axis 2, i.e. they can be considered to be obtained from juxtaposition around the main axis 2 of a plurality of similar angular sectors.

In the embodiment shown, the central core 1, the toric balloon 3, and the connection units 5 have symmetry relative to a median plane which is perpendicular to the main axis 2, which intersects diametrically the transverse straight cross-section of the toric balloon 3. However, this symmetry is not necessary, and the aerostat according to the invention can have an asymmetrical axial cross-section.

The support parts 4 are secured to the peripheral toric balloon 3, for example by being glued or welded on the interior, i.e. on the main axis 2 side. Each support part 4 has the general shape of an arc of a portion of a torus, with a shape corresponding to that of the peripheral toric balloon 3 to which it is attached. Each support part 4 is connected to the central core 1, for example by four cables 5, i.e. two upper cables 5a and two lower cables 5b, which are secured rigidly in the vicinity of each of the ends of the support part 4. The cables 5 are secured firstly to the corresponding support part 4, and secondly to the central core 1, by means of any appropriate rigid securing device (flange, cable clamp, looping the end of the cable through a ring, etc). The toric balloon 5 is integral in rotation with the central core 1.

The central core 1 is globally cylindrical in revolution around the main axis 2, it is rigid, hollow, and is designed to be able to contain the electronic and/or computer and/or telecommunications and/or energy-storage equipment, and/or equipment of an on-board mission. In the embodiment shown, the central core 1 comprises a base 6 and a cover 7. It should nevertheless be noted that this base 6 and this cover 7 are not essential, and the various items of equipment can be secured directly to the cylindrical walls inside the core 1. Preferably, the walls which form the cylindrical central core 1 are perforated, and consist of a rigid light material, for example a compound based on carbon fibres, such as to be as light as possible. The same applies to the support parts 4.

The various support parts 4 are regularly distributed around the main axis 2. Thus, the aerostat can comprise two diametrically opposite support parts 4. In the preferential embodiment shown, the aerostat comprises three support parts 4, which are regularly distributed at 120° C. from one another around the axis 2.

Each support part 4 supports a particle-emission propulsion unit 8 and/or a mobile flap 9.

According to the most basic embodiment of the aerostat according to the invention, the latter comprises two diametrically opposite support parts 4, one of which supports a propulsion unit 8, whereas the other supports a mobile flap 9. In the preferred embodiment shown, advantageously and according to the invention, each support part 4 supports a propulsion unit 8 and a mobile flap 9, and the aerostat comprises a plurality of support parts 4, and in particular more than two support parts 4, a plurality of propulsion units 8, and in particular more than two propulsion units 8, and a plurality of mobile flaps 9, and in particular more than two mobile flaps 9.

The propulsion units 8 consist of ionic actuators and/or air pulsation units. An ionic motor with a corona effect can for example be used as the ionic actuator. An axial air compressor can be used as the air pulsation unit. Particle-emission propulsion units of this type are already known.

Each propulsion unit 8 can be supplied with atmospheric air from the compartment 11 of the flap 9, and in particular the one which is secured to the same support part 4. For this purpose, each flap compartment 11 has an air intake aperture 27 upstream from the flap 9, and a pipe 26 for connection to the propulsion unit 8, such that the air enters upstream from the flap 9 into the compartment 11, and is supplied to the propulsion unit 8 by the pipe 26. The air is captured in the compartment 11 when the flap 9 is deployed, and is stored in this compartment 11 until it is used to supply the propulsion unit 8 when the latter is activated.

Each propulsion unit 8 is secured to a support part 4 by any appropriate securing means (flange, collar, welding, etc), and has a nozzle 10 for ejection of particles, which has a generally cylindrical shape. All the propulsion units 8 of the aerostat are oriented in the same direction, i.e. with their ejection nozzles 10 oriented in order to drive the aerostat in rotation around its main axis 2 in the same direction. Each propulsion unit 8 is secured to the support part 4, such that its ejection nozzle 10 extends at least substantially in the direction which is perpendicular to the bisector of the angular sector which is defined by the arc of the portion of a torus formed by the corresponding support part 4. Thus, each propulsion unit 8 is secured to the support part 4, such as to exert a drive force which is at least substantially tangential (relative to the peripheral toric balloon 3, at its point of intersection with the bisector of the angular sector defined by the support part 4).

In addition, the aerostat is designed to fly with the main axis 2 extending at least substantially vertically, with the median plane perpendicular to the axis 2, which extends at least substantially horizontally, as shown in the Figures. In order to decrease as much as possible the centre of gravity of the aerostat and to assure its horizontal stability, the propulsion units 8 are preferably disposed in a position which is as low as possible, on the lower part of the support parts 4, beneath the lower cables 5b, as shown in the Figures.

Each mobile flap 9 is integrated and supported in a compartment 11, which itself is rendered integral with one of the support parts 4, for example by means of a tube or connection bars 12. Each compartment 11, and the connection elements 12 which make it possible to attach the compartment to the support part 4, consist of a rigid material, for example a compound based on carbon fibres. Each flap 9 is fitted in the compartment 11 such as to extend at least substantially in an axial plane, i.e. in a plane which contains the main axis 2, and in a direction which is radial relative to this main axis 2. Each compartment 11 extends globally inside the space which is contained between the peripheral toric balloon 3 and the central core 1, as far as possible from the main axis 2. In the embodiment shown, each compartment 11 comprises a single flap 9, which is fitted such as to rotate around a shaft 13 which is at right angles to the main axis 2, and is supported by the compartment 11. The size of the compartment 11 is such that the flap 9 can be completely retracted and integrated in this compartment 11, in the inactive state. In addition, the flap 9 is fitted relative to the compartment 11 such that it can be deployed in the active state, in which it brakes the rotation of the aerostat around the main axis 2, whilst exerting aerodynamic thrust, which tends to displace the aerostat in translation, perpendicularly to the main axis 2. In the embodiment shown, each compartment 11 is open towards the top, and the mobile flap 9 is fitted such that it can be deployed upwards, vertically by rotation around the shaft 13, by means of an electric motor 14, which is incorporated inside the compartment 11, on the shaft 13.

As a variant, it would also be possible to fit the flaps 9 and the corresponding compartments 11 such that the flaps are deployed downwards. As a variant, each compartment 11 could also be secured to a support part 4 with two flaps 9 which are deployed respectively one upwards and the other downwards, in order to assure braking of the rotation on both sides of the median horizontal plane. The flaps can also be mobile in translation rather than in rotation, or according to a movement which combines rotation(s) and translation(s). In addition, each of the flaps 9 can also be profiled in the manner of an air brake. In fact, the function of these flaps is to provide maximum aerodynamic thrust in the active state, for a minimum weight of the assembly consisting of the flap 9, compartment 11, motor 14, and kinematic control mechanism 13.

The aerostat additionally comprises a flexible outer envelope 15, which for example consists of MYLAR®, which delimits a main chamber 16 which is sealed against gases, which, as well as the toric balloon 3, is pressurised by a gas which is lighter than air, for example helium. This envelope 15 extends around the peripheral toric balloon 3 and towards the main axis 2, above and below the central core 1.

Each of the ejection nozzles 10 of the propulsion units 8 passes through the envelope 15 in a sealed manner, such that the particles which are emitted by the propulsion units 8 are ejected outside the main chamber 16. Similarly, each of the mobile flaps 9 is disposed outside the outer envelope 15, the latter being interrupted and open at the level of the peripheral edges 22 of the aperture of the compartments 11 of the flaps.

The upper surface 17 of the upper portion 24 of the envelope 15 is covered with a set of photovoltaic solar cells 21, which can extend as far as the flap compartment 11, or even as far as the extreme peripheral part of the envelope 15, around the apertures of the compartments 11, if necessary. This set of solar cells 21 is connected electrically inside the central core 1, by appropriate electrical conductors, which pass through the envelope 15 in a sealed manner, and are connected to electrical energy storage means 18, formed by an accumulator battery or a fuel cell (for example such as those which were used in the space programmes (APOLLO, SPACE SHUTTLE, etc)). In this case also, storage means 18 which have the greatest capacity for the lowest weight are preferred. These electrical energy storage means 18 are incorporated inside the central core 1, as are the electronic and/or computer control means 19 for the propulsion units 8 and the flaps 9.

Electrical conductors 20 connect these control means 19 electrically inside the central core 1, firstly to each of the propulsion units 8, and secondly to each drive motor 14 for the mobile flaps 9, through the wall of the compartment 11, through which these conductors 20 pass in a sealed manner. The conductors 20 are for example supported by at least one of the cables 5 for connection of the support parts 4 to the central core 1, and preferably a lower connection cable 5b.

The aerostat according to the invention thus has a general outer shape (i.e. the outer contour defined by the outer envelope 15) which is globally symmetrical in revolution around the main axis 2. This shape is also globally lenticular, and its axial dimension parallel to the main axis 2 is smaller than its overall radial dimension perpendicular to the main axis 2. In addition, the shapes of the aerostat according to the invention are defined such as to minimise the coefficient of horizontal aerodynamic friction Cx (perpendicular to the axis 2). Advantageously, the aerostat according to the invention has an overall diameter of between 5 m and 100 m, and in particular approximately 30 m, and an overall axial height of between 1 m and 20 m, and in particular approximately 10 m, corresponding to the axial height of the central core 1. The diameter of the central core 1 is as small as possible, taking into account the volume thus delimited, which is designed to contain the electrical energy storage means 19 and the various items of electronic and computer equipment.

The volume of the main chamber 16 which is sealed against gases is designed to permit flight of the aerostat, in particular at a stratospheric altitude. This main chamber 16 can consist of a single volume or of several volumes which are imbricated and/or juxtaposed. It can thus be compartmentalised, and/or contain gas cells.

For example, the main chamber 16 is pressurised at an over-pressure (relative to the atmospheric pressure of the required flight altitude) of approximately 300 Pa, whereas the peripheral toric balloon 3 is pressurised at an overpressure (relative to the atmospheric pressure of the required flight altitude) of approximately 500 Pa, i.e. it is overpressurised relative to the main chamber 16 by an overpressure of approximately 200 Pa. Thus, the peripheral toric balloon 3 establishes and maintains the general lenticular shape of the aerostat.

In addition, it should be noted that the aerostat has an apparent surface area seen from the ground, which is extremely large in relation to its total weight. Thus, the aerostat according to the invention can incorporate a reflective radio-electric surface, which for example is of the type which makes it possible to reflect towards the ground radio-electric signals obtained from the ground. For example, the inner surface 23 which is oriented downwards, of the upper portion 24 of the outer envelope 15, can be metallised, the lower portion 25 of the outer envelope 15 being constituted from materials which are radio-electrically transparent. Thus, the upper portion 24 of the envelope 15 has a concave reflective surface which is oriented towards the ground. As a variant, there can also be incorporated a reflective surface of this type with an appropriate shape, and more generally any type of active or passive radio-communication antenna, inside the aerostat itself, in the main chamber 16 between the toric balloon 3 and the central core 1.

The aerostat according to the invention also comprises at least one receiver of the GPS (GLOBAL POSITIONING SYSTEM) or DORIS type, etc, or any other location device (gyroscope, telemetry means, acceleration meter, magnetometer, etc) which makes it possible to locate the position of the main axis 2 in relation to a reference point which is fixed, relative firstly to the ground, and secondly to the angular position of the aerostat in its rotation around the main axis 2.

According to an advantageous embodiment of the invention, the aerostat comprises a GPS receiver, which makes it possible to locate its position with accuracy of approximately 100 m relative to the ground. In addition, in order to locate the angular position of rotation of the aerostat around the main axis 2, the latter incorporates a magnetometer, the accuracy of which is approximately a degree, and which can be graduated according to the local magnetic field. This GPS receiver and this magnetometer are supported inside the central core 1.

As the GPS receiver, use can be made for example of a GPS TANS VECTOR receiver for determination of altitude and position, sold by the company TRIMBLE NAVIGATION (Hampshire, England). The antennae of the receiver are located and secured either on the periphery of the core 1, or on the support parts 4, in the vicinity of the toric balloon 3, or on the toric balloon 3 at the extreme periphery of the aerostat.

The aerostat also advantageously comprises means for transmission/reception which permit communication with the ground, in particular for programming of its horizontal position and/or its horizontal path. It also incorporates computer calculation means, which, from a predetermined instruction position (programmed in advance or received from the ground) and from the position determined by the location means, make it possible to determine a horizontal translation course. This course can be simply the straight line which passes through the instruction position and through the position located, optionally taking into account the relative wind, i.e. drift. A computer navigation system of this type is known, and does not need to be described in detail.

The on-board control means 19 are designed such that, in a first angular sector 28, which extends from one side in a radial direction Da, which is perpendicular to the main axis 2, and is fixed in relation to the relative wind, (independently from the rotation of the aerostat around the main axis 2), corresponding to the horizontal translation course to be imparted to the aerostat, each propulsion unit 8 is in the active state, and each flap 9 is in the inactive state, whereas in a second angular sector 29 which extends from the other side of this radial direction Da, each propulsion unit 8 is in the inactive state, and each flap 9 is in the active state, such that the aerostat is driven in translation in relation to the relative wind, according to this radial direction Da.

The first angular sector 28 and the second angular sector 29 are preferably bisectors of the plane angle defined by the direction Da, i.e. a straight line perpendicular to Da is the bisector of each of these angular sectors 28, 29. In addition, these angular sectors 28, 29 preferably have at least substantially the same angular value lower than 180°, and are symmetrical with one another relative to the direction Da.

The propulsion units 8 and the flaps 9 are designed to be able to be controlled from the inactive state to the active state, and from the active state to the inactive state in a period of less than $2\pi/4\omega$, $\omega$ being the speed of rotation of the aerostat expressed in radians per second, which is advantageously between 1 rd/s and 100 rd/s, and in particular approximately $2\pi$ rd/s.

Figure 5:
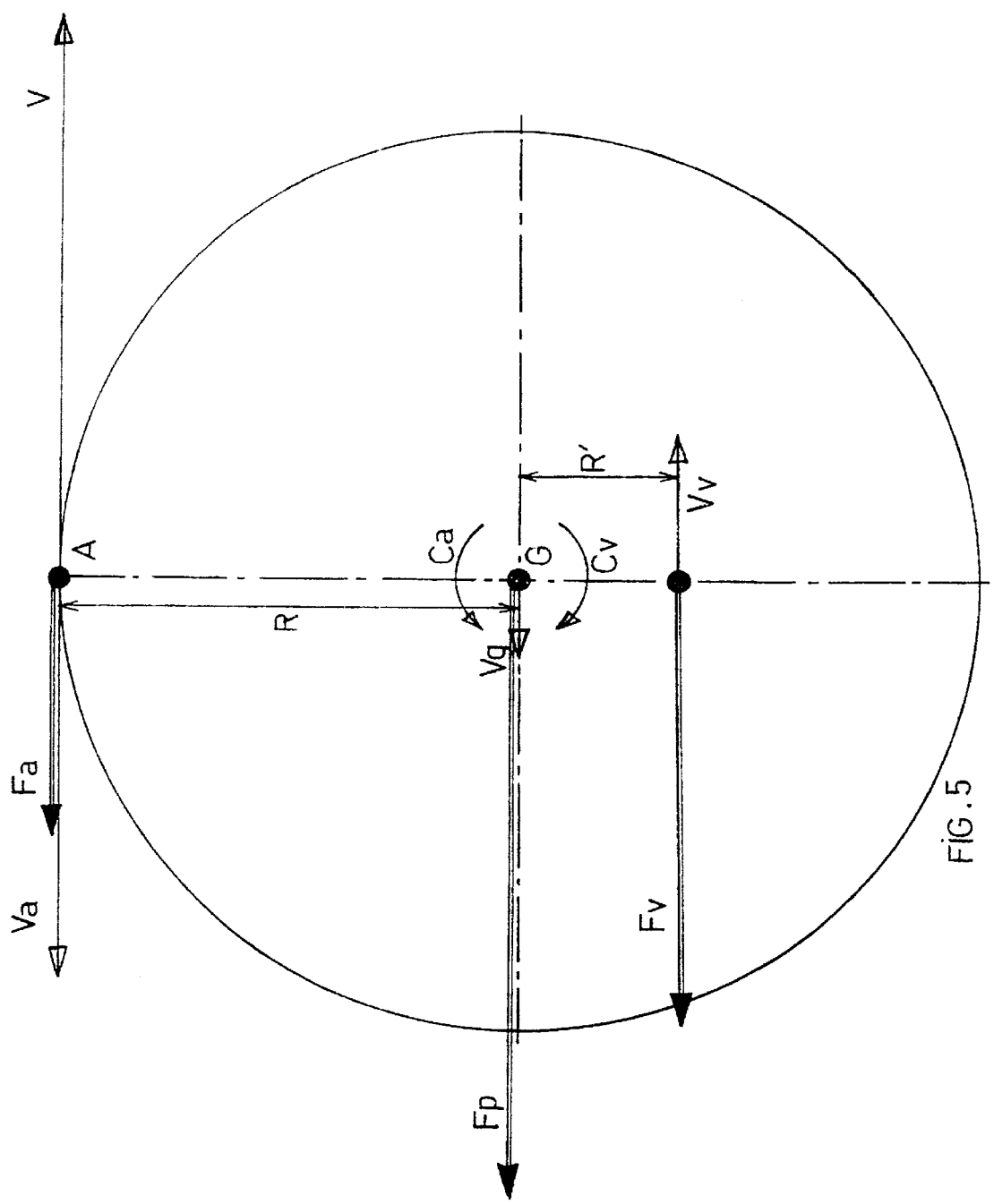
FIG. 5 is a skeleton drawing illustrating the functioning of the drive means of an aerostat according to the invention.

The diagram in FIG. 5 illustrates the functioning of an aerostat according to the invention, in the case of a single propulsion unit 8 and a single mobile flap 9, which are radially opposite relative to the main axis 2 (this hypothesis being used for reasons of simplification of the calculations). Let us consider a propulsion unit 8 which projects particles (ions, atoms, etc) at a relative speed V1 which is assumed to be homogenous, with a mass flow D (in kg/s), and which induces a propulsion force Fa applied to the centre of gravity G.

A is the point of connection of the propulsion unit 8, Va is the speed of this propulsion unit 8, G is the centre of gravity, which is assumed to be located on the main axis of rotation 2, and Vg is the speed of the centre of gravity G in relation to the volume of air.

The particles are emitted in a direction which is at least substantially opposite that of the speed vector $\vec{Vg}$. As a first approximation, the effect of the propulsion unit 8 can be broken down into a force Fa which is applied to the Centre of gravity, and moment Ca around the axis of rotation, such that:

Fa=V1.D

Ca=V1.D.R, R being the distance from A to G

Let us now consider the presence of a mobile flap 9 which is centred at a point B which is spaced from the axis 2 and from G by a distance R', R'<R, and is displaced at a speed Vv:

$$Vv = Vg + \frac{R'}{R} \cdot Va$$

The action of this flap 9 takes the form of a thrust force Fv and moment Cv around the axis of rotation 2.

$$Cv = -F_v R'$$

Let it be assumed that the extension of the flap 9 is made to coincide with the thrust of the radially opposite propulsion unit 8 (on the assumption that the mobile flap 9 can be extended and withdrawn infinitely quickly).

It should be noted that the effect of the drag forces (apart from those caused by the flap 9) is not necessarily located on the axis of rotation 2 (owing to the rotation of the aerostat), and can thus induce an aerodynamic drag moment. In order to simplify the calculation, it is assumed that this moment is negligible.

The on-board computer controls the surface of extension of the flap 9, so that the global average angular acceleration is zero (the speed of rotation of the aerostat remaining at least substantially constant):

Ca+Cv=0

Fa.R−Fv.R'=0

$$Fv = \frac{R}{R'} \cdot Fa$$

The global thrust force Fp is therefore equal to:

$$Fp = Fv + Fa = Fa \cdot \left[1 + \frac{R}{R'}\right]$$

The control means 19 control each propulsion unit 8 such that the force exerted by the propulsion unit 8 is on average oriented parallel to the required direction of advance Da. Similarly, the control means 19 control each flap 9 such that the force exerted by the flap 9 is on average oriented parallel to the required direction of advance Da. For this purpose, it is sufficient for the duration of the transition from the inactive state to the active state of the propulsion unit 8, or of the flap 9, to be the same as that of the transition from the active state to the inactive state, and for the path described by the propulsion unit 8 or the flap 9 in the active state to be symmetrical relative to the straight line which is perpendicular to the direction of advance Da and to the main axis 2.

Figure 4:
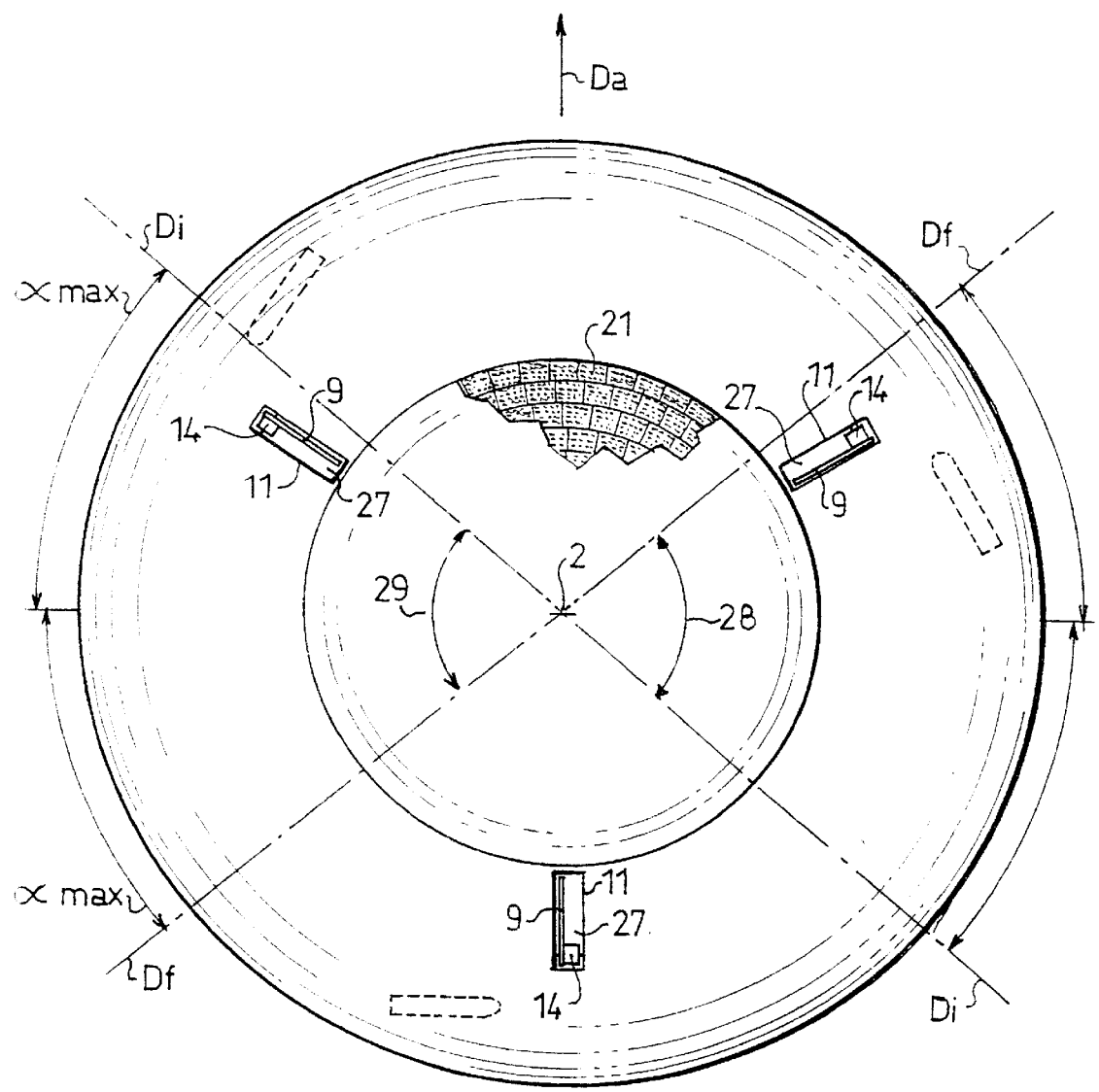
FIG. 4 is a plan view from above of the aerostat in FIG. 1.

Preferably, the angular position from which a flap 9 begins to be activated is fixed in relation to the required direction of advance Da, and is aligned radially with the angular position, which is fixed in relation to the required direction of advance Da, from which a propulsion unit 8 begins to be activated. Similarly, the angular position which is fixed in relation to the required direction of advance Da, from which a flap 9 ceases to be activated, is aligned radially with the angular position, which is fixed in relation to the required direction of advance Da, of a propulsion unit 8, from which it is completely inactive. Thus, FIG. 4 shows the straight line Di which represents the angular position from which a flap 9 begins to be deployed (active), and a propulsion unit 8, which is opposite in relation to the axis 2, begins to be activated, and the straight line Df representing the angular position from which a flap 9 ceases to be completely retracted (inactive), and a propulsion unit 8 is completely inactive. These two straight lines Di, Df form between them an angle which represents the angular course in which the flap 9 and a propulsion unit 8 opposite it are active. The value which is equal to half this angle is known as αmax. The direction of advance Da is a bisector of Di and Df. The straight lines Di and Df define between them the said first angular sector 28 and the second angular sector 29.

Each propulsion unit 8 is activated for a portion of the period of rotation, and the direction of thrust is not always perfectly aligned with the speed vector, thus inducing a loss of efficiency which can be translated in terms of output r. If a propulsion unit 8 and a flap 9 are activated only when the loss of aim of the thrust force Fp is smaller than the angle αmax, the output r is:

$$r = \frac{1}{2\alpha max} \cdot \int_{-\alpha max}^{+\alpha max} \cos\alpha \cdot d\alpha = \frac{\sin \alpha max}{\alpha max}$$

Finally, the global gain factor γ of the propulsion of the aerostat according to the invention in relation to a fixed propulsion unit is:

$$\gamma = r \cdot \left[1 + \frac{R'}{R}\right]$$

It should be noted that for αmax=40°, r≅0.92.

The gain γ makes it possible to reduce the power, and therefore the weight of each propulsion unit 8 in relation to the requirement for thrust force.

In the case of a non-rotary conventional airship (according to the prior state of the art) with propulsion units, the kinetic energy of the particles emitted by the propulsion units (operated at a speed which is conventionally approximately a few hundred meters per second) is transmitted only at a low rate to the airship, the speed of which is relatively low (typically 10 m/s). After being ejected, the particles continue to be driven at a high speed which corresponds to unused kinetic energy.

In the case of the aerostat according to the invention, the propulsion unit 8 is itself driven at a high speed (lower than the speed of ejection of the particles, but very much higher than the speed of translation of the aerostat), in a direction opposite of that of ejection of the particles. Once they have been ejected, the latter are driven at a speed which is far lower than that which they would have had if the propulsion unit 8 had been immobile, and this can therefore be considered as better use of the propulsion energy.

More directly, since the power of a force applied at a given point is equal to the product of this force times the speed of this point, the power of propulsion developed by the propulsion unit 8 is far greater in the case of an aerostat according to the invention than in the case of a conventional airship. As a result, in particular, an aerostat according to the invention can be supplied entirely by solar energy, and can thus be kept in a geostationary position in the upper atmosphere.

By way of example, with an aerostat according to the invention, the following can be applicable:

radius R of the aerostat: 15 m height H of the aerostat at the level of the main axis 2 (overall axial dimension): 10 m volume at an altitude of 21 km: 2200 m³ outer surface area: 1700 m² weight: 150 kg maximum speed of translation in relation to the relative wind: 150 km/h electrical power consumed: 20 kW Vg=10 m/s ; ω=2π rad/s ; αmax=40°; r=92%; Va=ωR=94 m/s; R'=10 m; Vv=53 m/s; γ=0.92×(1+15/10)≈2.3.

The electronic and/or computer control means 19 make it possible to pilot the aerostat according to the invention in accordance with control logic which makes it possible to control its position and/or path. Control means of this type are known. For example, use can be made of control means such as those described in the publication "THE PRONAOS PROJECT: DESIGN, DEVELOPMENT AND IN-FLIGHT RESULTS" F. BUISSON et al, IAF-97, Turin, Jun. 10, 1997.

In addition, the stable horizontal position of the aerostat is assured passively, since the centre of gravity G is below the median horizontal plane. Any deflection from the stable horizontal position will thus give rise to a moment of return which is proportional to the sine of the angle of deflection.

In addition, in the presence of a quasi-horizontal relative wind, the aerostat according to the invention acts in the manner of an aircraft wing, and any deflection (lower than a limit value) relative to the stable horizontal position introduces an aerodynamic moment of return.

Aerostats according to the invention can be placed at a stratospheric altitude of, for example, 21 km above the ground.

The invention can be applied in particular for production of systems for location of mobile land, maritime or aeronautical units, in particular by differential measurement of the length of the radio-electric path between the mobile units and aerostats according to the invention, or for production of telecommunication systems, in particular for multi-media applications and communications with mobile units.

What is claimed is:

1. A free aerostat, comprising:
   a strengthening structure (1, 3, 4, 5), which defines a shape which is symmetrical relative to a main axis (2);
   at least one main chamber (16) closed in a sealed manner, which is integral with the said structure, and is pressurised by a gas which is lighter than air, such as to permit flight of the aerostat;
   means (8, 9) for driving the aerostat comprising:
   one or a plurality of particle-emission propulsion units (8) supported by the said structure, which are regularly distributed around the main axis (2), and are designed to be able to drive the aerostat in rotation in one direction around the main axis (2), and to be able to be controlled from an active state to an inactive state and vice-versa, at least once for each rotation of the aerostat around the main axis (2);
   one or a plurality of mobile flaps (9), which are supported by the said structure outside the main chamber (16), are distributed regularly around the main axis (2), and are designed to be able to be controlled at least once for each rotation of the aerostat around the main axis (2), from an active state, in which they brake the rotation of the aerostat, whilst exerting aerodynamic thrust which tends to displace the aerostat in translation perpendicularly relative to the main axis (2), to an inactive state, in which they do not offer any substantial resistance to the rotation of the aerostat, and vice versa; and
   on-board control means (19), which are designed to control the propulsion units (8) and the flaps (9) in order to
   drive the aerostat in continuous rotation around the main axis (2); and
   drive the aerostat in translation, with at least one component which is perpendicular to the main axis (2), relative to the volume of air in which it moves.

2. An aerostat as claimed in claim 1, wherein it has an overall axial dimension parallel to the main axis (2) which is smaller than its overall radial dimension perpendicular to the main axis (2).

3. An aerostat as claimed in claim 2, wherein it has a general outer shape which is globally symmetrical in revolution around the main axis (2), and in particular is globally lenticular.

4. An aerostat as claimed in claim 1, wherein it comprises at least one propulsion unit (8) which is an ionic actuator.

5. An aerostat as claimed in claim 1, wherein it comprises at least propulsion unit (8) which is an air pulsation unit.

6. An aerostat as claimed in claim 1, wherein it comprises at least one flexible outer envelope (15), which delimits at least one main chamber (16) which is sealed against gases and is pressurised by a gas lighter than air, and each of the mobile flaps (9) is disposed outside this outer envelope (15).

7. An aerostat as claimed in claim 6, wherein each propulsion unit (8) is secured to the structure (1, 3, 4, 5) inside the envelope (15), and has a particle-ejection nozzle (10), which passes in a sealed manner through the envelope (15).

8. An aerostat as claimed in claim 1, wherein it comprises an on-board energy source (21, 18) which is designed to assure the energy supply at least of each propulsion unit (8).

9. An aerostat as claimed in claim 8, wherein the energy source (21, 18) comprises:
   photovoltaic solar cells (21) which are disposed on at least one upper surface portion (17) of the aerostat; and
   means (18) for storage of electrical energy.

10. An aerostat as claimed in claim 1, wherein the on-board control means (19) are designed such that, in a first angular sector (28) which extends from one side in a radial direction (Da) perpendicular to the main axis (2), and is fixed in relation to the relative wind (independently from the rotation of the aerostat around the main axis (2)), each propulsion unit (8) is in the active state and each flap (9) is in the inactive state, whereas in a second angular sector (29) which extends from the other side of this radial direction (Da), each propulsion unit (8) is in the inactive state, and each flap (9) is in the active state, such that the aerostat is driven in translation in relation to the relative wind, at least substantially according to this radial direction (Da).

11. An aerostat as claimed in claim 1, wherein the drive means (8, 9) are designed to be able to drive the aerostat in rotation at a speed ω of between 1 rd/s and 100 rd/s.

12. An aerostat as claimed in claim 11, wherein the speed ω is approximately 2πrd/s.

13. An aerostat as claimed in claim 1, wherein each propulsion unit (8) and each flap (9) is designed to be able to be controlled from the inactive state to the active state, and from the active state to the inactive state in a period of less than 2π/4ω, ω being the speed of rotation of the aerostat expressed in radians per second.

14. An aerostat as claimed in claim 1, wherein it comprises means for location of the position of the main axis (2) relative to a reference point which is fixed in relation to the ground, and means for location relative to this fixed reference point for the angular position of the structure (1, 3, 4, 5) relative to the main axis (2), and the said control means (19) comprise calculation means which are designed to determine the control signals to be applied to each propulsion unit (8) and to each flap (9), according to signals issued by these location means, and in accordance with a predetermined instruction signal for the horizontal position and/or the horizontal path of the main axis (2), relative to the fixed reference point.

15. An aerostat as claimed in claim 1, wherein each of the propulsion units (8) is associated with a peripheral portion (3, 4) of the structure (1, 3, 4, 5) which is furthest away from the main axis (2), and is disposed such as to exert a drive force which is at least substantially tangential.

16. An aerostat as claimed in claim 1, wherein each of the flaps (9) is associated with a peripheral portion (3, 4) of the structure (1, 3, 4, 5) which is furthest away from the main axis (2), and is disposed such as to exert a force which is at least substantially tangential.

17. An aerostat as claimed in claim 1, wherein the structure (1, 3, 4, 5) comprises a peripheral toric balloon (3), which is sealed against gases and is over-pressured by a gas lighter than air, to a pressure greater than that of the main chamber (16), it comprises the same number of propulsion units (8) as flaps (9), and it comprises support parts (4) which are secured to this toric balloon (3), and are regularly distributed around the main axis (2), each support part (4) supporting at least one propulsion unit (8) and/or at least one mobile flap (9).

18. An aerostat as claimed in claim 1, wherein the structure (1, 3, 4, 5) comprises:

a rigid, globally cylindrical hollow central core (1), which can enclose the electronic and/or computer and/or telecommunications and/or energy storage equipment, and/or equipment of an on-board mission;

an over-pressurised peripheral toric balloon (3);

support parts (4) which are secured to the peripheral toric balloon (3), and support the propulsion unit(s) (8) and the mobile flap(s) (9);

connection means (5), which connect the central core (1) and the support parts (4); and an outer envelope (15), which surrounds and/or completes the volume delimited by the peripheral toric balloon (3) and the central core (1), in order to circumscribe at least one pressurised, sealed main chamber (16).

19. An aerostat as claimed in claim 1, wherein each mobile flap (9) extends at least substantially radially, and is mobile parallel to the main axis (2), between a position retracted in a flap compartment (11), in which it does not interfere with the relative current of air obtained from displacements of the aerostat relative to the volume of air in which it is placed, and a deployed position, in which it interferes with the current of air, and tends to brake the rotation of the aerostat around the main axis (2).

20. An aerostat as claimed in claim 1, wherein the gas consists of helium, and the volume of the main chamber (16) is designed to permit stratospheric flight of the aerostat.

21. An aerostat as claimed in claim 1, wherein it has an overall radius of between 5 m and 50 m, in particular of approximately 15 m, and an overall axial height of between 1 m and 20 m, and in particular approximately 10 m.

* * * * *